April 26, 1949.   H. A. OLANDER   2,468,229
CHEESE-CUTTING DEVICE
Filed Sept. 5, 1947
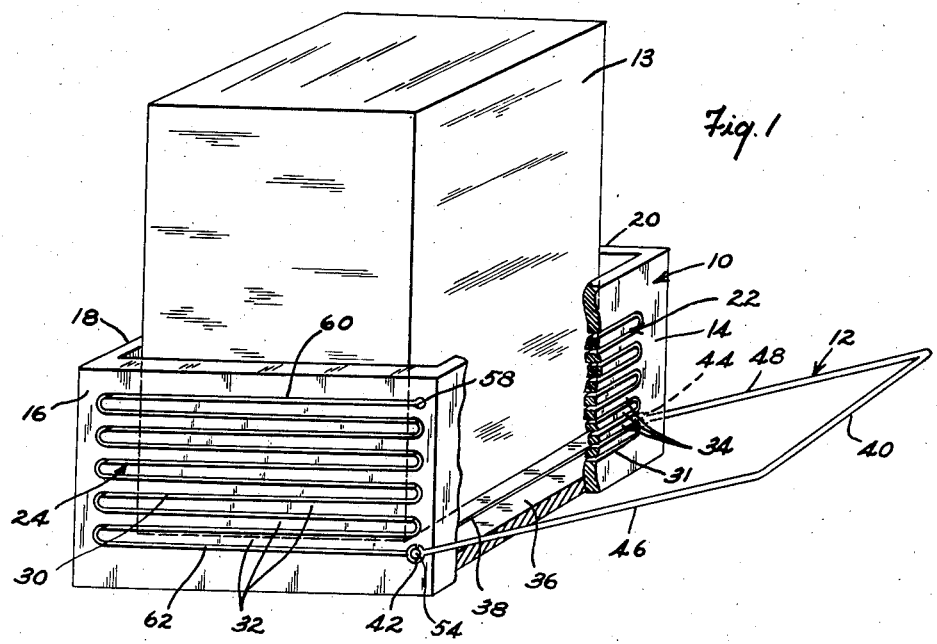
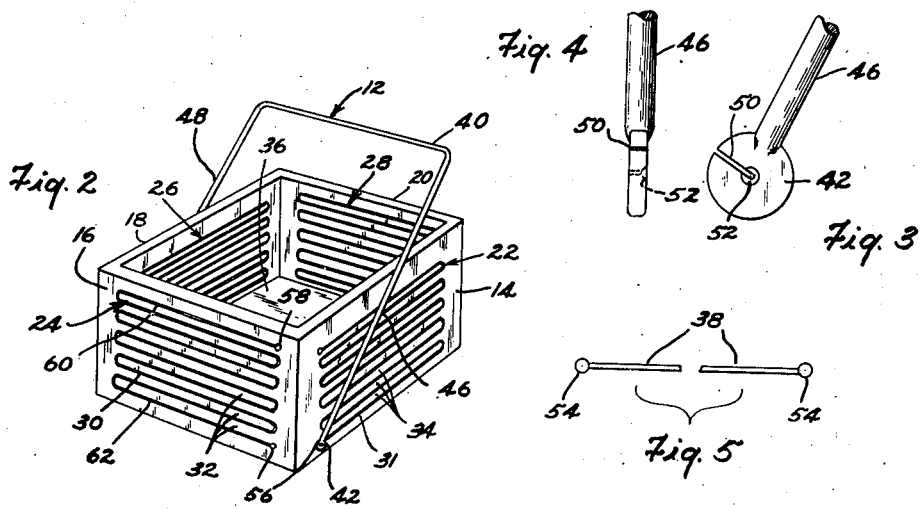
INVENTOR.
Harold A. Olander
BY
Thiess Olson & Mecklenburger
ATTYS.

Patented Apr. 26, 1949

2,468,229

UNITED STATES PATENT OFFICE 2,468,229

CHEESE-CUTTING DEVICE

Harold A. Olander, Chicago, Ill.

Application September 5, 1947, Serial No. 772,447

8 Claims. (Cl. 31—25)

This invention relates to cutting devices and more particularly to a small, inexpensive device for cutting cheese and the like. Often it is desirable, as well as thrifty, for the housewife to purchase a large loaf or brick of cheese at one time, thus guaranteeing freshly cut cheese at all times and substantial savings on the purchase price of such food.

Various types of cheese cutting devices have heretofore been proposed which are either too bulky in construction or too expensive to produce, or both, thus making such devices less adaptable and attractive for home use.

It is one of the objects of this invention to provide an improved cutting device for cheese and the like which is durable as well as simple in operation, compact in construction, and inexpensive to manufacture, thereby rendering it a practical and suitable device for home use.

It is a further object of this invention to provide a cutting device whereby a loaf or brick of cheese may be cut into a plurality of slices of uniform thickness.

Further and additional objects will appear from the description, accompanying drawings and appended claims.

In accordance with the embodiment of this invention, a holder is provided having a base and either a pair or two pairs of vertically extending sides with a tortuous slot molded or cut therethrough in each side. The said holder is constructed or molded from lightweight material preferably a plastic and is shaped into a boxlike receptacle with the top removed. The slots in the opposite sides are identical, each slot having a plurality of parallel horizontal sections serially connected. The spacing between the parallel horizontal sections of the pairs of slots varies slightly thereby allowing a variance in the thickness of the slices depending on which pair of slots is used. Cooperating with said holder is a cutting instrument comprising a wirelike blade tautly held between the ends of the arms of a U-shaped handle. The handle is so shaped that its arms have a slight spring outwardly thus giving the desired tautness to the blade when held between the ends of the arms.

For a more complete understanding of this invention reference should now be had to the drawings, wherein:

Fig. 1 is a perspective view of the cutting device with a loaf of cheese in place and a portion of one of the vertical sides of the holder cut away to show the manner in which the tortuous slot extends therethrough;

Fig. 2 is a perspective view of the cutting device with the cheese removed;

Fig. 3 is a side elevational view of the end portion of one of the arms of the U-shaped handle;

Fig. 4 is a front end view of Fig. 3; and

Fig. 5 is a fragmentary view showing the ends of the wire-like blade of the cutting instrument.

Referring now to the drawings, the principal embodiments of this invention are a holder 10 and a cutting instrument 12 cooperating with said holder. Holder 10 is constructed or molded of a lightweight material preferably plastic to form a boxlike receptacle with the top removed, whereby the same is adapted to receive a loaf or brick of cheese 13, as shown in Fig. 1, which it is desired to cut or slice. The vertically extending sides 14, 16, 18 and 20 have cut or molded therethrough tortuous slots 22, 24, 26 and 28 respectively. The tortuous slots 24 and 28, extending through sides 16 and 20 respectively, are identical as are also the slots 22 and 26 extending through sides 14 and 18.

Each tortuous slot comprises a plurality of horizontal parallel sections 30 and 31 serially connected and uniformly spaced. The spacing 32 between the horizontal parallel sections of tortuous slots 24 and 28 is slightly greater than the spacing 34 between the horizontal parallel sections of slots 22 and 26. Thus when desiring thick slices of cheese the pair of slots 24—28 are used as guides for the cutting instrument 12, as hereinafter described. When desiring thinner slices, slots 22—26 are used.

The loaf of cheese 13 to be cut up rests as shown in Fig. 1, on a base plate 36 of the holder 10 and remains in that position while the cutting instrument 12 is manipulated. The cutting instrument 12, as shown in Fig. 1, comprises a wirelike blade 38 and a U-shaped handle 40 of resilient material. The blade 38 is adapted to engage with either slots 22—26 or 24—28. Thus by reciprocating the cutting instrument 12 the blade 38 thereof, with its ends engaging either the slots 24—28 or 22—26 progressively passes from one set of horizontal slot sections to the next, thereby cutting the cheese into slices of uniform thickness. The handle 40 is shaped in such a manner that the arms 46—48 normally diverge slightly and, when engaged by the ends of the blade, are placed under tension and have a tendency to spring outwardly, thus holding the blade taut.

The ends 42—44 of the handle 40 are enlarged and flattened as shown in Fig. 3. A groove 50 is provided in each end as shown to allow the wirelike blade 38 to pass through it. The inside end of the groove 50 is countersunk to provide a seat 52.

At the ends of the blade 38 are provided beads or enlargements 54 by welding or upsetting or any other suitable means. Thus when the blade 38 is to be held between the ends 42—44 of the handle 40, the ends 42—44 are slightly pressed together and the blade 38 passed through grooves 50. When the ends 42—44 are released the beads 54 engage the seats 52 and are thus held securely in place.

Enlarged holes 56—58 are provided at each end of the tortuous slots 22, 24, 26, 28 to permit the enlargements 54 of the blade 38 to pass through the tortuous slots at either the top 60 or bottom 62 of said slots, thereby permitting ready removal of the blade.

When the cutting blade reaches the top 60 of the tortuous slot, the remainder of the loaf or brick of cheese is lifted off and the slices removed. Thus during the cutting operation the slices are neatly stacked and held in place until removed.

It will be obvious that certain modifications of the specific embodiment shown may be made without departing from the spirit and scope of this invention. For example, the holder may consist of only one pair of vertical extending sides instead of the two pairs as shown. Also the number of parallel horizontal slot sections may be varied and the spacing between said slots enlarged or narrowed as may be desired.

From the foregoing it will be readily seen that a lightweight, simple, compact, and inexpensive cutting device for cheese and the like has been provided which will cut the last or first slice with the same uniform thickness.

While several particular embodiments of this invention are described above, it will be understood, of course, that this invention is not to be limited thereto, since many modifications may be made, and it is contemplated, therefore, by the appended claims, to cover any such modifications as fall within the true spirit and scope of this invention.

I claim:

1. In a device of the class above described, the combination of a holder comprising a base and a pair of parallel, vertically extending sides, each of said sides having a tortuous slot extending therethrough said slots being substantially alike, and a cutting instrument, said instrument comprising a thin elongated blade and a handle therefor, said blade extending through and being slidable in the slots of said vertical sides.

2. In a device of the class above described, the combination of a holder comprising a base and a pair of parallel, vertically extending sides, each of said sides having a tortuous slot extending therethrough, said slot comprising a plurality of serially connected, elongated sections parallel to said base and spaced uniformly apart, and a cutting instrument, said instrument comprising a thin elongated blade and a handle therefor, said blade having its ends extending through the slots of said vertical sides and being tautly held by said handle.

3. In a device of the class above described, the combination of a holder comprising a base and a pair of parallel, vertically extending sides, each of said sides having a tortuous slot extending therethrough said slots being substantially the same configuration and a cutting instrument comprising a wirelike blade and a handle, said blade being guided in said slots and being tautly held between the ends of the arms of said handle, said cutting instrument being of the size to permit of disengagement from said slots when disconnected from said handle.

4. In a device of the class above described, the combination of a holder comprising a base and two pairs of parallel, vertically extending sides forming a boxlike receptacle having an open top, each of said pairs of parallel sides having tortuous slots extending therethrough, and a cutting instrument, comprising a thin elongated blade and a handle therefor, said blade extending through the slots of either pair of parallel sides and being tautly held by said handle.

5. In a device of the class above described, the combination of a holder comprising a base and two pairs of parallel, vertically extending sides forming a boxlike receptacle having an open top, each of said pairs of parallel sides having tortuous slots extending therethrough, each of said slots comprising a plurality of, serially connected, elongated sections parallel to said base and spaced uniformly apart, and a cutting instrument comprising a thin elongated blade and a handle therefore, said blade extending through the slots of either pair of parallel sides and being tautly held by said handle.

6. In a device of the class above described, the combination of a holder comprising a base and two pairs of parallel, vertically extending sides arranged to form a boxlike receptacle having an open top, each of said pairs of parallel sides having tortuous slots extending therethrough, each of said slots comprising a plurality of, serially connected, elongated sections parallel to said base and spaced uniformly apart, the spacing between the said elongated sections of the slots of the two pairs of sides being different, and a cutting instrument comprising a thin elongated blade and a handle therefor, said blade being adapted to extend through and slidably engage the slots of either pair of said sides.

7. In a device of the class above described, the combination of a holder comprising a base and a pair of parallel vertically extending sides, each of said sides having a tortuous slot formed therein, said slot comprising a plurality of uniformly spaced, serially connected, elongated sections, of equal length, said sections being substantially parallel to said base, and a cutting instrument comprising a thin wirelike blade and a handle therefor, said blade extending through said pair of slots and being tautly held by said handle.

8. In a device of the class described, the combination of a holder comprising a base and a pair of parallel vertically extending sides having opposed congruent tortuous slots, each of said slots comprising a plurality of spaced serially connected elongated sections, said sections being substantially parallel to said base, and a cutting instrument slidably engaging said slots, said instrument comprising a handle and a cutting blade held thereby.

HAROLD A. OLANDER.

REFERENCES CITED

The following references are of record in the file of this patent:

UNITED STATES PATENTS

| Number | Name | Date |
|---|---|---|
| 865,447 | Stewart | Sept. 10, 1907 |
| 1,751,264 | Cross et al. | Mar. 18, 1930 |